Oct. 25, 1955　　　　J. R. CLIFTON　　　　2,721,714
METHOD AND MEANS FOR PREVENTING BACKLASH IN
A FULL POWERED AIRPLANE CONTROL SYSTEM
Filed Nov. 14, 1952　　　　　　　　　　　2 Sheets-Sheet 2
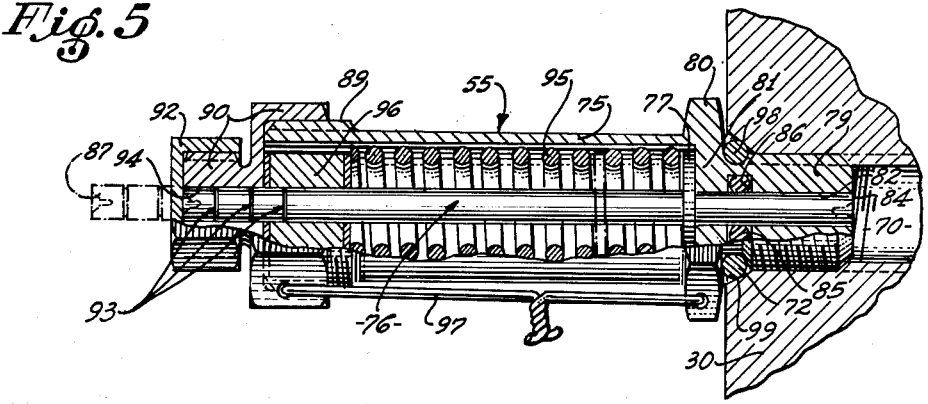
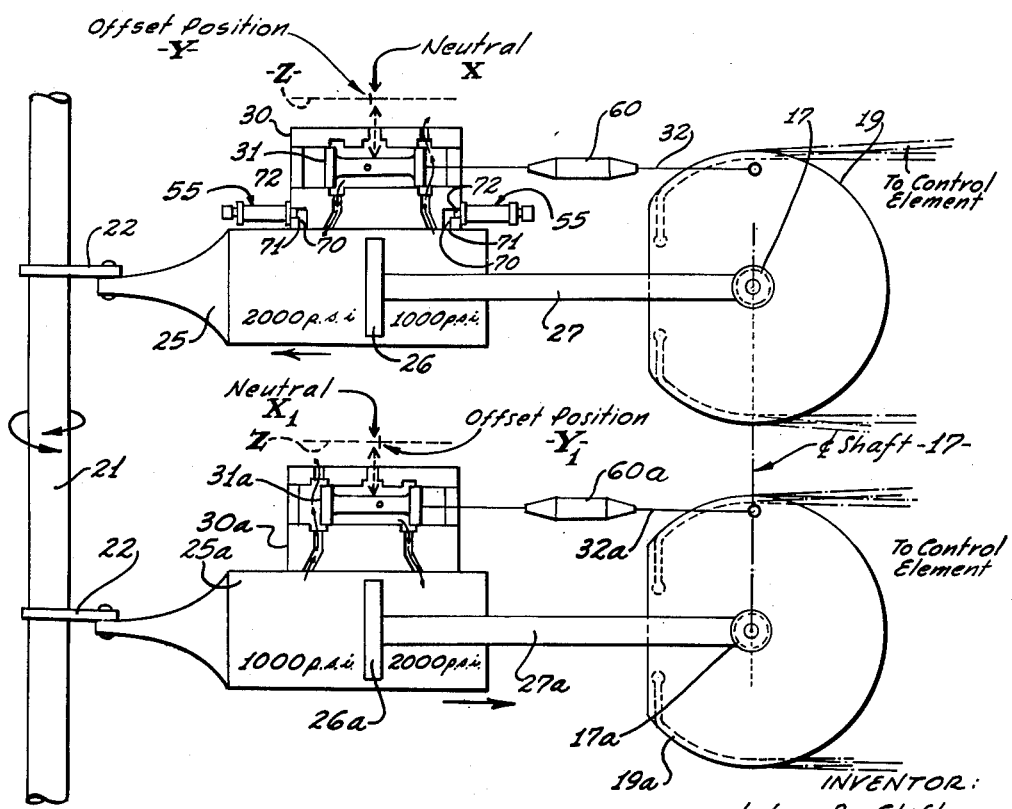
INVENTOR:
John R. Clifton
By Hubert E. Metcalf
His Patent Attorney

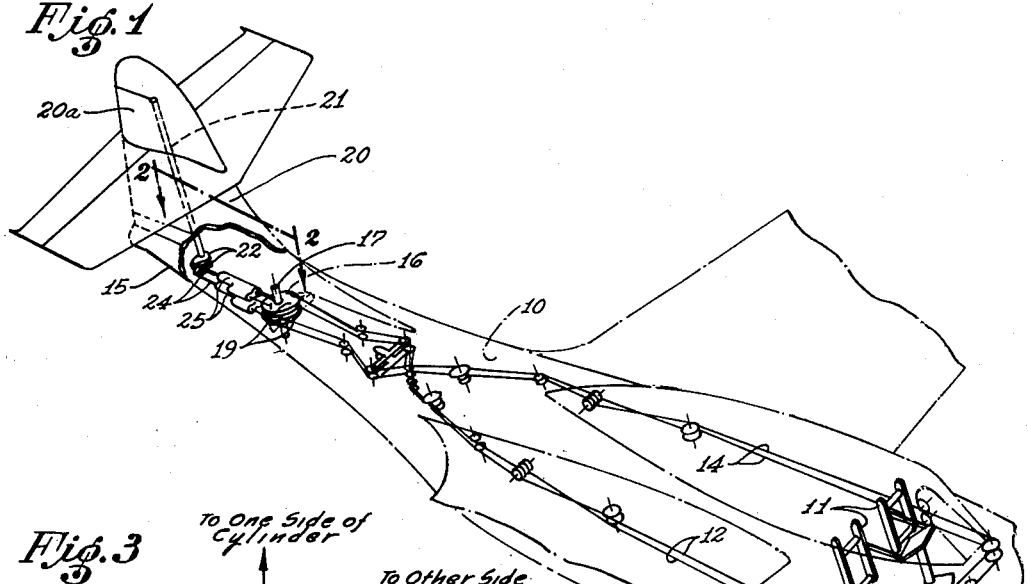

United States Patent Office 2,721,714
Patented Oct. 25, 1955

2,721,714

METHOD AND MEANS FOR PREVENTING BACKLASH IN A FULL POWERED AIRPLANE CONTROL SYSTEM

John R. Clifton, Rolling Hills, Calif., assignor to Northrop Aircraft, Inc., Hawthorne, Calif., a corporation of California Application November 14, 1952, Serial No. 320,577

12 Claims. (Cl. 244—85)

My invention relates to airplane control systems, and is an improvement on the full powered airplane control system of the copending patent application Serial No. 23,567, filed April 27, 1948, by Feeney, now abandoned, in which is described, shown and claimed, an airplane control system wherein a control surface, such as a rudder or elevator for example, is moved solely by hydraulically powered actuators by pilot action.

In the above control system the control surfaces are preferably operated by pairs of hydraulic motors connected to each surface in parallel with cross-connected valves, each separately connected to the pilot's stick. This measure is taken for the main part in the interests of safety, wherein if the control cables to the valve of one actuator are damaged or parted, the valve of the parallel actuator will still operate the control surface through its separate control cables. Also, if one of the actuators is rendered inoperable such as by the jamming of its control valve for instance, the other actuator will still be capable of operation as will be described later.

For the control of certain of the above mentioned control surface actuators, a control valve housing is preferably attached to the actuator cylinder, or is made integral therewith, and has a valve spool therein which is movable along a line parallel with the axis of the actuator cylinder each way from a central neutral position to direct the flow of fluid to one side or the other of the actuator piston to move the actuator cylinder and the control surface connected thereto. The valve spool only is connected to the pilot's control stick, or rudder pedals as the case may be, so that the only force which actually has to be exerted by the pilot is the force necessary to move the valve spool. Moreover, in this type of system no control surface air load is ever transmitted back to the pilot's control stick or rudder pedals.

The above control valve is preferably of the neutral leakage type; being designed to provide at the neutral position thereof, a predetermined fluid flow of a relatively low magnitude to both sides of the piston in the actuator cylinder, while simultaneously allowing a flow of equal magnitude to return therefrom. In a 2000 p. s. i. constant pressure hydraulic system for example, the above valve at neutral will create a balanced preload of approximately 1000 p. s. i. on each side of the actuating cylinder piston to impart rigidity and normal irreversibility to the connected control surface. One example of the neutral leakage valve just discussed is described, shown, and claimed in the copending application Serial No. 123,375, filed October 25, 1949, by Strayer, now Patent 2,612,872, October 7, 1952.

In the type of control system referred to, it has been found that backlash may occur in the actuator-surface connections when the control surface is in neutral position where the air load on either side thereof is substantially the same, which backlash might lead to the development of control surface flutter during certain conditions of flight.

One object of the present invention is to provide a full powered airplane control system which includes a novel method and means for reducing backlash in the control surface actuator connections.

It is a further object to provide a novel means in connection with the backlash reduction method of the present invention, to simplify and expedite practice of the same.

It is still another object of the present invention to provide a novel method and means of reducing backlash in the above control system, wherein the method and means can be integrally associated with the control system.

Other objects will be seen as the specification ensues.

Briefly, the present invention, in the particular embodiment thereof which includes a pair of hydraulically powered actuators connected in parallel to operate a single control surface as was previously described provides a new and novel arrangement of the actuator control valves wherein a differential in preload pressures is established between the parallel power actuators, and maintained in balanced opposition to each other during operating conditions where the control surface is in a substantially no-airload position, i. e. is at a close to trailing position.

Means can be provided in connection with the control system above, to facilitate adjustment of the control valves to obtain the desired pressure preload differentials. This means can take the form of a pair of pressure sensitive members connected one on each side of the piston and movable in response thereto. Indicating means can also be provided if desired; being associated with each pressure sensitive member to gauge the amount of pressure and give a visual indication of the same.

A clearer understanding of the present invention will result upon examination of the drawings accompanying the following detailed specification.

In the drawings:

Figure 1 is a diagrammatic view in perspective of hydraulically powered control system for the rudder of an airplane.

Figure 2 is a diagrammatic plan view of one hydraulic servomotor shown in Figure 1, as seen from above the unit; the hydraulic power circuit for the motor also being schematically shown.

Figure 3 is a longitudinal sectional view diagrammatically showing a neutral leakage valve, one example of which is demonstrated in illustrating the use of the present invention.

Figure 4 is a schematic view of a pair of hydraulic servomotors connected in parallel to operate the torque shaft of a control surface.

Figure 5 is a longitudinal view partly in section and partly in elevation showing the construction of one preferred embodiment of the present invention.

Referring to Figure 1 of the specification drawings, an airplane 10 is provided with the usual rudder pedals 11 in the pilot's cockpit, these pedals 11 operating right rudder cables 12 and left rudder cables 14 in the customary manner; the cables being paired in sets for safety precaution. Adjacent the tail structure 15 of the airplane 10, a quadrant bracket 16 is securely mounted on the airframe of the airplane 10 to support a vertical quadrant shaft 17.

A pair of cable quadrants 19 are mounted to pivot horizontally on the quadrant shaft 17; the quadrants 19 being pivoted by left cables 14 passing around one side thereof, and right cables 12 passing around the other side thereof; all of the cables being connected to the quadrants 19 in the usual manner.

The fuselage of the airplane 10 supports a vertical fin 20 in which a vertical rudder 20a is hinged to pivot on a vertical torque shaft 21 mounted in the vertical fin 20.

A pair of laterally extending operating arms 22 are attached at the base of the torque shaft 21 and are respectively connected to the ends of the cylinder rods 24 of a pair of hydraulic actuator cylinders 25 mounted in parallel in the tail of the airplane 10.

The hydraulic actuators are identically connected to operate the rudder torque shaft 21; one only being shown in Figure 2. A cylinder rod 24 is coaxially and directly attached to one end of the hydraulic actuator cylinder 25; the cylinder rod 24 being normally at close to a right angle with its respective arm 22. In the case of each actuator cylinder 25, a piston 26, shown in dotted lines therein, is provided with a coaxial piston rod 27 which extends out of the opposite end of the cylinder 25 and is connected by means of an end bearing 29 pivoted around the quadrant shaft 17.

Each actuator cylinder 25 is operated by a control valve 30 which is preferably mounted on one side thereof. In the valve 30, a valve spool 31 is mounted as shown in dotted lines, being movable therein along a line parallel with the axis of the cylinder 25. The valve spool 31 extends out one end of the valve 30 and is connected to a valve actuating rod 32 extending parallel with the piston rod 27; being attached by a quadrant pin 34 to a quadrant arm 35 which is in turn affixed to the cable quadrant 17. Pivoting of the quadrant 17 by the pilot through the rudder cables 12 and 14, moves the operating rod 32 and valve spool 31 in either direction from a neutral position to admit fluid under pressure to one side or the other of the actuator piston 26 as will be explained in the next figure.

In the hydraulic system shown, power is usually provided by a pump 36 driven from the engine or motor 37; fluid being taken from a reservoir 39 and pumped to the valve 30 through a pressure line 40. Exhaust fluid is returned from the actuator to the reservoir 39 through a return line 41. The system at hand preferably utilizes a constant pressure of 3,000 p. s. i. for example, and when one actuator only is used to operate a surface, employs the neutral leakage type valve 30 to place a balanced preload of approximately 1,500 p. s. i. on each side of the piston 26 to provide for gust stabilization of the control surface.

In the above neutral leakage type of hydraulic control valve 30 which is illustrated in greater detail in Figure 3, a hollow sleeve 45 is fixed within the valve casing 46. The casing has a central fluid pressure inlet 47, cylinder supply connections 49 on either side of the pressure inlet 47, and a return flow connection 50 beyond each cylinder supply connection 49. The valve spool 31 is slidably mounted in the sleeve 45; the spool 31 having lapped lands 51 contacting the interior of sleeve 45 between the pressure inlet 47 and the return connections 50, to control fluid flow through the valve to and from the actuator cylinder. The spool lands 51 are positioned to open one of the cylinder supply connections 49 to the inlet 47, and simultaneously open the other cylinder connection 49 to one of the return connections 50 when the spool 31 is moved in either direction from a nearly exactly centered neutral position with respect to the valve sleeve wherein the valve spool 31 delivers a balanced flow to each side of the piston in the actuator cylinder to create a balanced preload thereon. The two cylinder supply connections 49 are defined by a number of metering holes 52 through the sleeve 45; the holes 52 being staggered lengthwise around the periphery of the sleeve 45. It can thus be seen that as the metering holes 52 are progressively uncovered by movement of the spool 31 in one direction away from the neutral position thereof, a restricted but increasing flow is admitted to one side of the piston, meanwhile restrictedly permitting fluid on the other side of the piston to escape to a return connection.

The valve 30 forms no part of the present invention however, as was mentioned early in this specification.

In the initial rigging and adjustment of dual hydraulic actuators according to the present invention, I deviate from the neutral leakage system just described, and unbalance the preload pressure on each side of the cylinder pistons to create a pressure differential therebetween; the preload differential between the two sides of the piston in one cylinder being established in diametric opposition to the preload differential between the two sides of the piston in the other cylinder. In this manner, backlash in the dual actuator arrangement can be effectively prevented.

To date the best results have been achieved using a ratio of approximately a 2:1 ratio pressure differential in a hydraulic control system operated from a 3,000 p. s. i. constant pressure source for example, the pressure on one side of the piston in one hydraulic actuator cylinder can be 2,000 p. s. i. the pressure on the other side of the piston being 1,000 p. s. i. and in the parallel hydraulic motor cylinder the pressure differential should be established in the same ratio but in opposite order, to place the preload pressure differentials in each cylinder opposite each other.

Establishing the proper differential pressures just described entails adjusting one neutral leakage valve to an offset position with respect to the centralized neutral position of the neutral leakage type of system wherein the valve delivers an equal flow on each side of the piston in the single actuator cylinder. In the off-set position of the valve, a positive flow will then exist on one side of the piston in its respective motor cylinder and in the parallel motor wherein the valve is centered in the neutral leakage position, the positive flow of the manually off-set valve will constrain the parallel motor valve, through the connection linkage, to move to an off-set position opposite to that of the manually adjusted valve as will be described later.

Figure 4, which is greatly simplified, diagrammatically shows the hydraulic actuator and connection linkage shown in detail in Figures 1, 2, and 3, therefore the same numbers are used to identify each of the components, wherein a pair of hydraulic actuator cylinders 25 and 25a are connected in parallel to a pair of arms 22 mounted to operate rudder torque shaft 21; the piston rods 27 and 27a being commonly connected to a quadrant shaft 17. Quadrants 19 are mounted to pivot around the quadrant shaft 17 to move the operating rods 32 and 32a which are respectively connected to longitudinally operate valve spools 31 and 31a in valves 30 and 30a as was described in Figures 1 and 2. In the position shown in Figure 4, the actuators and connecting linkage, rudder, and control pedals are all in the neutral position, as shown in Figure 1. If each of the actuators were preloaded in balance, as would be the case when only one actuator is involved, the valve spools 31 and 31a in valves 30 and 30a would then be positioned as denoted by X, i. e., in nearly the exact center of the valve 30, so that the end metering holes discussed in Figure 3 would only be partially covered by the spool lands 51, to permit a neutral leakage to exist therethrough to deliver an exact flow to each side of the cylinder piston, on the pressure side and allow an equal flow to exist out of the return side. According to my present invention, however, it is desired to greatly reduce or prevent backlash in all the connection points, such as by creating the differential in the pressure preloads on each side of the cylinder pistons as stated.

To properly establish the desired differential pressure both valve spools 31 and 31a are preferably positioned, by means of turnbarrels 60 and 60a on operating rods 32 and 32a, to central positions in the valve casings. By adjusting the operating rod 32 of the actuating cylinder valve 30 by means of turnbarrel 60 thereon, valve spool 31 is then positioned slightly to one side of the central point X to an off-set position point Y as indicated on dotted line Z which, for the sake of clarity, represents the axis of spool 31. As this adjustment takes place, the flow is increased to one side of the piston 26, the cylinder 25 moving in accordance therewith, thereby moving the companion cylinder 25a, through the connecting linkage, until the spool 31a of the companion valve 30a is in the off-set position $Y_1$ point on the other side of the neutral point $X_1$ corresponding to that of parallel spool 30, to provide an equal positive pressure flow to the opposite side of the piston 26a in the companion cylinder 25a. This being accomplished, each cylinder 25 and 25a is thus provided with the preload differential pressure in accordance with the teaching of the present invention.

The action of the system under the conditions of the differential pressures is such that any backlash in the connection linkage between the two actuators is effectively reduced to negligibility. In the neutral position of the control surface as shown in 4, the pressure differentials are opposed so that one actuator bucks the other, and furthermore, if the pressure differential will automatically vary to the same value on the opposite side of the other actuator through the connection linkage to maintain the backlash removing condition.

It is thus seen that in the novel off-set position of each valve spool 31 and 31a, the neutral positions of the control surface, power actuators, and control element are established in a state of equilibrium by the force reaction between the opposing actuators at neutral surface position during all flight conditions.

To obtain the most accurate preload differential, I can provide indicators 55 which can be installed either on the cylinder or in the valve; the valve installation preferably being used in the present example. The indicators are used to gage the pressures on each side of the piston to obtain the proper preload pressure ratios. As shown, a passage 70 is provided at each end of the valve 30, the opening 71 at one end of each passage 70 communicating with the interior of the cylinder 25 on respective sides of the piston 26. The opening 72 at the other end of the passage 70 is sized and threaded to receive the indicator as shown in Figure 5.

In construction, the indicator 55 of Figure 5 can be very simple and inexpensive. A cylinder 75 houses an indicator rod 76 having a flat disc 77 coaxially mounted thereon near one end thereof. On the exterior of the cylinder 75 at one end thereof, a threaded male adaptor 79 is provided; an exterior lug nut 80 being provided just inwardly of the adaptor 79. The interior of the cylinder 75 is separated from the adaptor 79 by the extension of the lug nut 80 toward the axis of the cylinder 75 to form a partition 81. A smooth cylindrical bore 82 extends coaxially through the partition 81 and adaptor 79 connecting the interior of the cylinder 75 with an opening 84 at the extreme end of the adaptor 79. One end of the indicator rod 76 is extended through the bore 82; the bore 82 being lapped and sized to a sliding fit with rod 76. A ring seal 85 retained in an internal annular groove 86 prevents the leakage of fluid into the cylinder 75.

At the other end of the cylinder 75 an external threaded portion 89 is threadably fitted with a cap 90 having a smaller externally threaded portion 91 threadably fitting an end cap 92 which, when installed, encloses and retains the indicator rod 76 inside the cylinder 75 assembly. A coaxial bore 94 through the cap assembly 90 is lapped and sized to a sliding fit with indicator rod 76 which extends therethrough. Inside cylinder 75 a coil spring 95 is provided between an inner spacer 96 at one end thereof, and the rod disc 77 at the other end thereof.

Spring 95 is normally compressed between spacer 96 and disc 77 to retain the indicator rod 76 in position as shown in solid line. However, when the cylinder assembly is installed in the valve passage 70 with end cap 92 removed, the pressure fluid from one side of the piston in the hydraulic motor cylinder is directed through the passage 70 and brought to bear against the end of the indicator rod 76 which is then moved against the force of spring 95, out of the end of the cap assembly 90, as shown in dotted line, which end of the rod 76 has a number of annular indicator marks 93 thereon. Indicator marks 93 are preferably spaced apart by distances representing gradients of 1000 pounds of pressure, which marks must, of course, be calibrated beforehand in accordance with data such as the size of hydraulic motor cylinder, diameter of passage-diameter of rod 76, etc. as is well known in the art. It can be here mentioned that the bottoms of the annular marks 93 can be colored with a suitable dye or paint to render them easier to use, if desired. When the indicator is not in use, cap assembly 90 can be tied with nut 80 using ordinary safety wire 97 as shown. A seal 98 is retained around adaptor 79; being seated in the tapered opening 99 of passage 70 to prevent leakage therearound.

Thus it can be seen, that with indicators 55 on each side of the cylinder piston, the valve spool 31 can be positioned by adjusting the operating rod 32, to a position where the preload differential forces the indicator rod 76 out of the indicator cylinder far enough to expose two indicator rings 93, the other indicator rod 76 exposing but one indicator ring 93. The operator then knows that the ratio of preload pressure is 2:1. The indicator 55 can be permanently installed and available for use at any time.

It has thus been shown that my invention provides a full powered airplane control system in which backlash is effectively prevented at surface neutral under substantially all operating conditions.

While my invention has been illustrated as applied to the control system of an airplane, it will be immediately apparent to those skilled in the art, that the principle of the method and means described herein can be applied with equal success to other types of control systems, and while in order to comply with the statute, the invention has been described in language more or less specific as to structural features, it is to be understood that the invention is not limited to the specific features shown, but that the method and means herein disclosed comprises a preferred form of putting the invention into effect, and the invention is therefore claimed in any of its forms or modifications within the legitimate and valid scope of the appended claims.

What is claimed is:

1. In an aircraft control system, a control surface to be moved in either direction from a surface neutral position, a pair of motors connected in parallel to move said surface, a power source to energize said motors, separate power control means connected intermediate said power source and each of said motors and movable in either direction from a neutral position to control said power to energize said motors, pilot control means, means connecting both of said power control means to said pilot control means, said power control means being moved by said pilot control means in parallel and in the same direction to energize said motors, one of said power control means being preset in an off-set position on one side of said neutral position, the other said power control means being preset in an off-set position on the other side of said neutral position to cause said motors to exert equal and opposite forces on said control surface during all operating conditions when said surface is in said surface neutral position.

2. In an aircraft control system, a control surface to be moved in either direction from a surface neutral position, a pair of hydraulic motors connected in parallel to move said control surface, a source of fluid under pressure to energize said motors, separate valves connected intermediate said power source and each of said motors and movable in either direction from a valve neutral position to control said fluid under pressure from said power source to energize said motors, pilot control means, means connecting both of said valves to said pilot control means, said valves being movable by said control element in parallel and in the same direction to energize said motors, one of said valves being preset in an off-set position on one side of said valve neutral position, the other valve being preset in an off-set position on the opposite side of said valve neutral position to cause said motors to exert equal and opposite forces on said control surface during all operating conditions when said surface is in said surface neutral position.

3. Apparatus in accordance with claim 2, wherein said valves controlling the flow of fluid under pressure to said motors are neutral leakage type valves.

4. The combination in a hydraulically powered aircraft control system which includes a control surface to be moved and pivoted on the frame of an aircraft from a neutral position, a pair of hydraulic cylinders mounted in parallel and each connected at one end thereof to both move in unison in one direction and pivot said control surface in one direction, and in the opposite direction to move said control surface in the opposite direction, a hydraulic piston in each cylinder, each of said pistons having a coaxial piston rod extending through the other end of said cylinder, a shaft mounted to the frame of said airplane, each of said piston rods being connected to said shaft, quadrants coaxially mounted to pivot on said shaft, a separate valve housing connected to and movable with each of said cylinders, valve means in each of said valve housings and movable therein from a system valve-neutral position to control the flow of fluid from a source of fluid under pressure into and out of each cylinder on opposite sides of the piston therein each of said valve means having an equi-leakage position wherein the pressures in the corresponding cylinder are balanced, a valve operating rod attached to each valve means at one end thereof, each rod being connected at the other end thereof to one of said quadrants and operated by movement thereof, pilot control means for pivoting said quadrants to move and pivot said control surface, said valve-neutral positions being equally and oppositely displaced from said equi-leakage positions of said valve means in order to cause said cylinders to exert equal and opposite forces on said control surface during all operating conditions while said control surface is in its said neutral position.

5. In a hydraulic control system which includes a shaft operable either way from a neutral position, a pair of hydraulic actuators connected in parallel to operate said shaft, each of said actuators including a piston and a cylinder, separate control valve casings associated with each of said cylinders and movable therewith, a valve spool slidably mounted in each of said valve casings and movable in either direction from a neutral position to control the flow of operating pressure fluid into and out of said cylinders on each side of said piston to operate said shaft; indicating means for connection with said cylinders for determining the amount of pressure on each side of said pistons.

6. Apparatus in accordance with claim 2 wherein said indicating means is a pressure sensitive member communicating with the interior of said cylinder and the pressure therein on either side of said piston.

7. Apparatus in accordance with claim 2 wherein said indicating means is a pressure sensitive member communicating with the interior of said cylinder and the pressure therein on either side of said piston, said indicating means having visual means associated therewith to indicate the amount of pressure in said cylinder on either side of said cylinder.

8. Apparatus in accordance with claim 2 wherein said indicating means is a pressure sensitive member communicating with the interior of said cylinder and the pressure therein on either side of said piston, and visual means associated with said pressure sensitive members, said visual means comprising a plurality of calibrated marks defining gradients of pressure.

9. In combination with a pair of hydraulic actuators connected to operate in parallel, each of said cylinders including a piston driven within a cylinder by fluid from a source of fluid under pressure, separate control valve casings connected with each of said cylinders, valve spools slidably mounted in each of said valve casings and movable in either direction from a neutral position to control the flow of fluid into and out of said cylinders on each side of said pistons, said valve spools being shaped to provide a predetermined neutral leakage flow into and out of said pistons when said valves are in said neutral position to create a pressure preload on each side of said piston; a pressure indicator associated with each side of the piston in one of said cylinders and communicating with the pressure therein, each indicator comprising an airtight receptacle mounted adjacent said cylinder on either side of said piston, a coaxial bore extending longitudinally through said receptacle, one end of said bore being open to atmosphere, the other end of said bore being open in said cylinder on its respective side of said piston and open to said pressure, a pressure sensitive member slidably mounted in said bore, one end of said member terminating at one opening of said bore, the other end of said member terminating at the other end of said bore, elastic means in said receptacle to urge said member toward the opening of said bore in said cylinder, and means at the other end of said member to define a plurality of visible pressure indications, whereby when the pressure in said cylinder impinges the end of said member, said member is forced through said bores to extend out of said bore into atmosphere to expose said visible pressure indications in proportion to the amount of said pressure in said cylinder.

10. Apparatus in accordance with claim 6 wherein said pressure sensitive member is a rod having a portion of increased diameter coaxially positioned thereon adjacent the pressure end of said receptacle, and elastic means positioned around said rod in said receptacle between said portion of increased diameter and the other end of said receptacle, said elastic means urging said portion of increased diameter toward said pressure end.

11. Apparatus in accordance with claim 6 wherein said pressure sensitive member is a cylindrical rod slidably fitting said bore, a disc coaxially mounted on said rod adjacent the pressure end of said receptacle, a spring encircling said rod in said receptacle, one end of said spring abutting said disc, the other end of said spring abutting the end of said receptacle opposite said pressure end, said spring bearing against said disc to urge said rod toward said pressure in said cylinder.

12. A hydraulic control system including a member to be moved in either direction from a neutral position, a pair of hydraulic motors connected in parallel to move said member, control valves mounted on and movable with each of said motors and operable in either direction from a neutral position to control the flow of operating fluid from a source of fluid under pressure to each of said motors for operation thereof, and means for connecting said control valves for operation in parallel, said valves being arranged to operate in either direction from opposite sides of said neutral position to cause said motors to exert equal and opposite forces on said member during all operating conditions when said member is in said neutral position.

References Cited in the file of this patent

UNITED STATES PATENTS

| | | |
|---|---|---|
| 1,339,850 | Johnson | May 11, 1920 |
| 1,890,041 | McLeod | Dec. 6, 1932 |
| 1,935,004 | Winther | Nov. 14, 1933 |
| 2,395,671 | Kleinhans et al. | Feb. 26, 1946 |
| 2,479,063 | Forsythe | Aug. 16, 1949 |
| 2,619,304 | Feeney et al. | Nov. 25, 1952 |